United States Patent
Azzouz et al.

(10) Patent No.: US 7,144,064 B2
(45) Date of Patent: Dec. 5, 2006

(54) VEHICLE BODY HAVING A FORWARD FACING REAR DOOR

(75) Inventors: Musa Azzouz, Northville, MI (US); Michael David Pevovar, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/266,649

(22) Filed: Nov. 3, 2005

(65) Prior Publication Data
US 2006/0043773 A1  Mar. 2, 2006

Related U.S. Application Data

(60) Continuation of application No. 10/908,475, filed on May 13, 2005, now Pat. No. 7,000,976, which is a continuation of application No. 10/463,013, filed on Jun. 17, 2003, now Pat. No. 6,913,308, which is a division of application No. 09/669,423, filed on Sep. 25, 2000, now Pat. No. 6,609,748.

(51) Int. Cl.
*B60J 5/00* (2006.01)

(52) U.S. Cl. .............. 296/146.1; 296/146.5; 296/146.11; 296/202

(58) Field of Classification Search ............ 296/146.1, 296/146.5, 146.6, 146.9, 146.11, 146.12, 296/202, 204; 49/365
See application file for complete search history.

(56) References Cited

U.S. PATENT DOCUMENTS 4,719,665 A * 1/1988 Bell ............................ 16/232
6,305,737 B1 * 10/2001 Corder et al. .......... 296/146.11

OTHER PUBLICATIONS http://www.autopedia.com/Ford/96_Econo.html.*

* cited by examiner

*Primary Examiner*—Lori L. Coletta
(74) *Attorney, Agent, or Firm*—Damian Porcari

(57) ABSTRACT

A forward facing rear door assembly for a motor vehicle includes a forward facing rear door having a forward end and a rear end. The forward facing rear door assembly also includes a hinge connected to the rear end of the forward facing rear door and for connection to a "C" pillar of a vehicle body to allow a forward end of the rear door to open and close a door opening in the vehicle body.

32 Claims, 8 Drawing Sheets

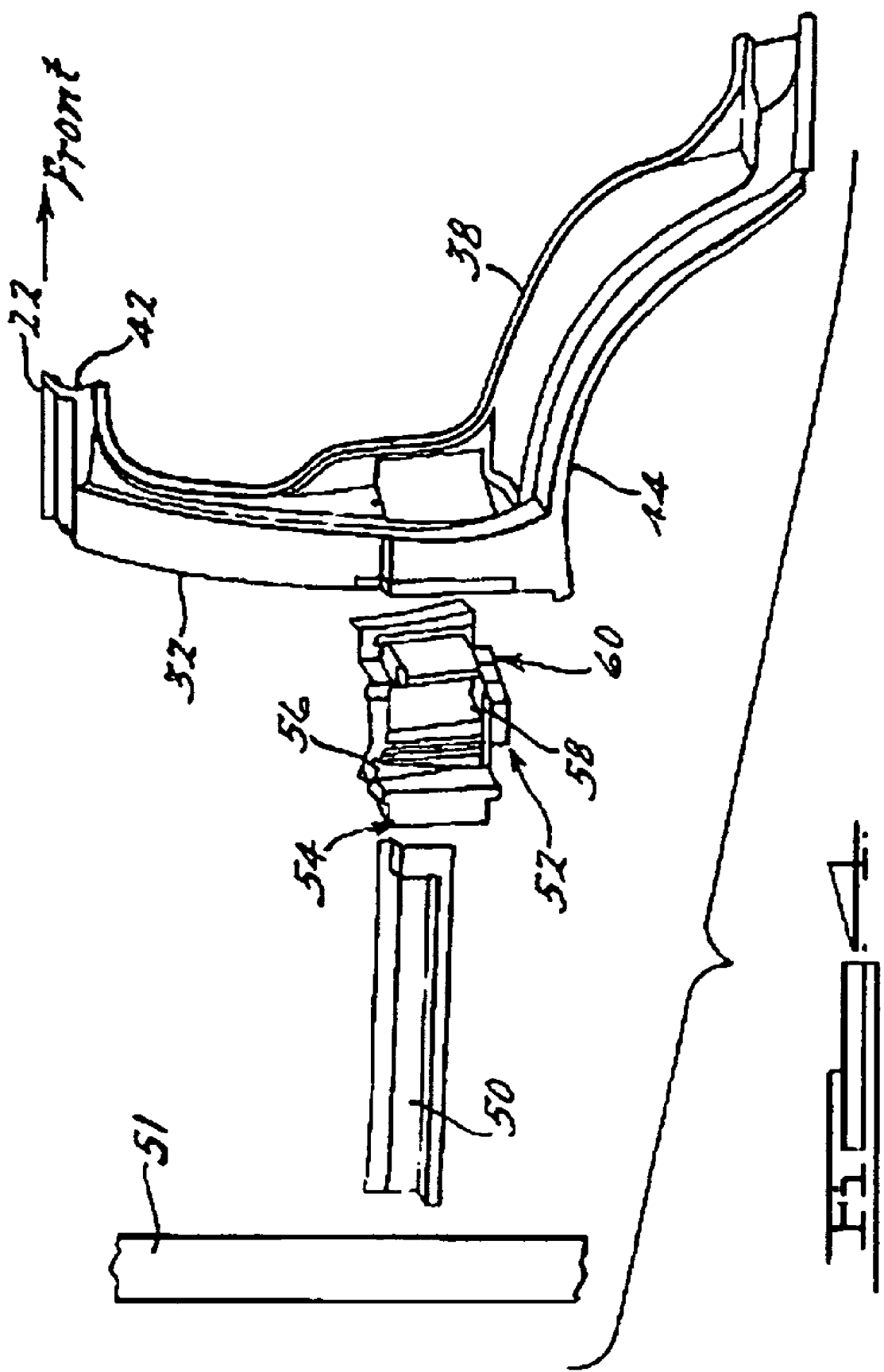

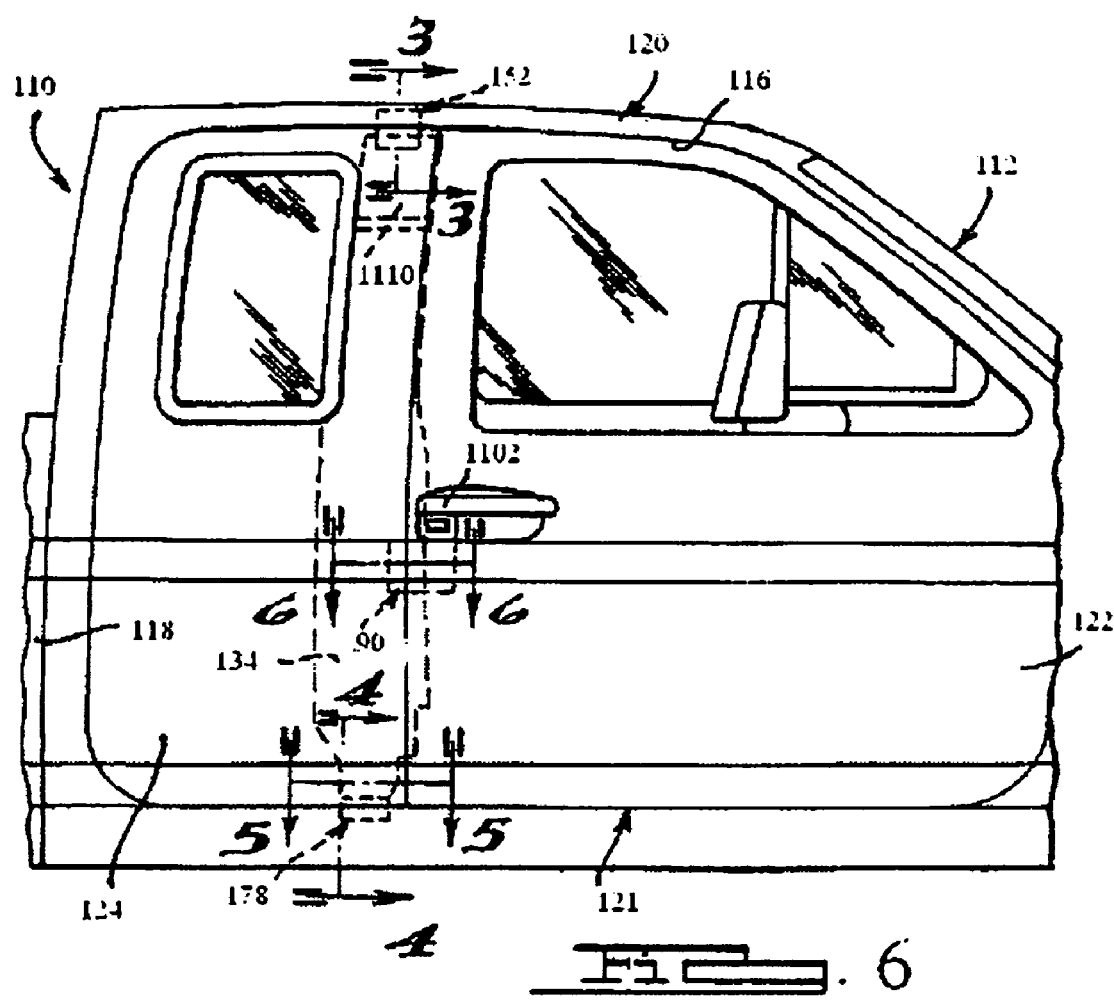

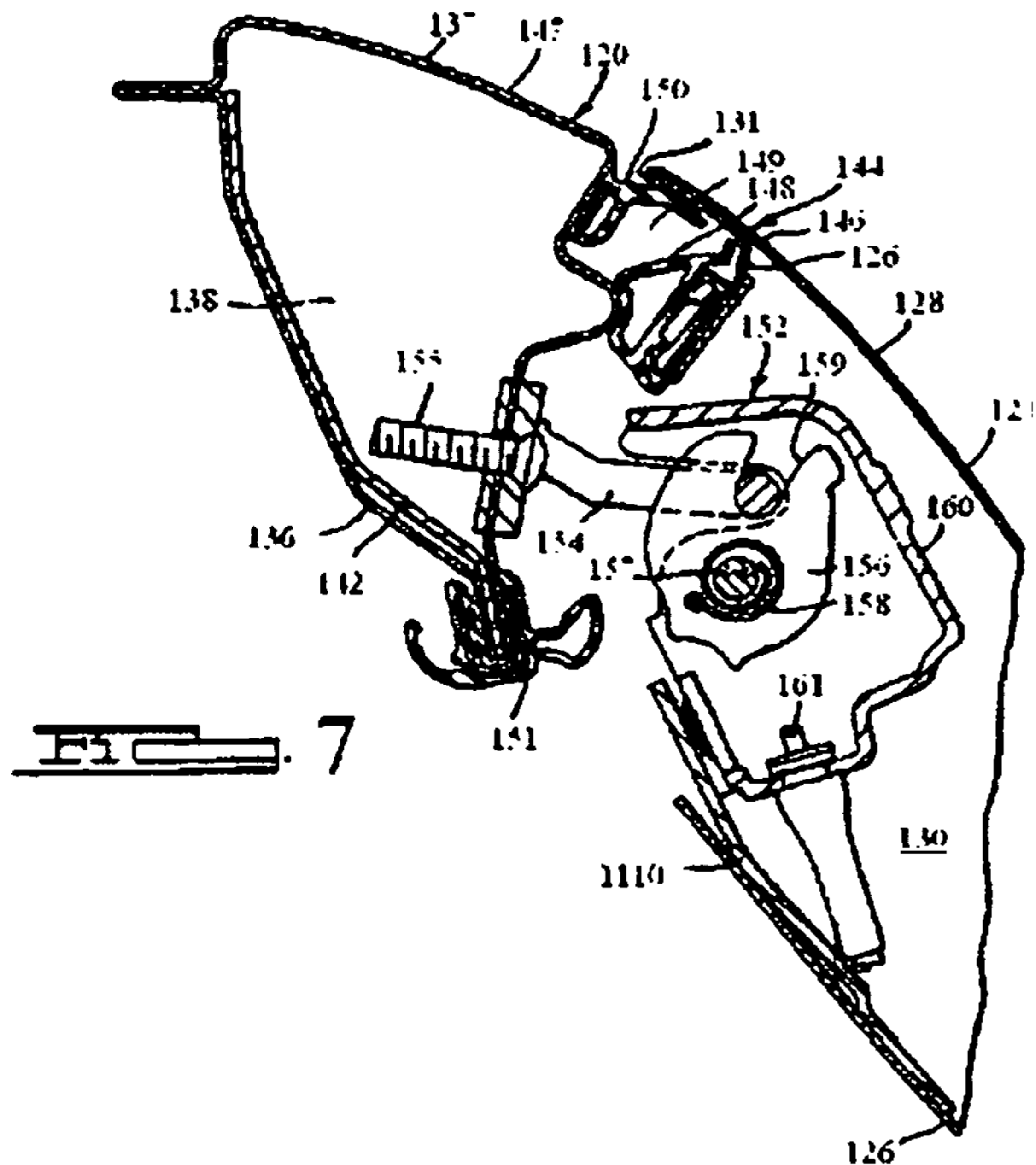

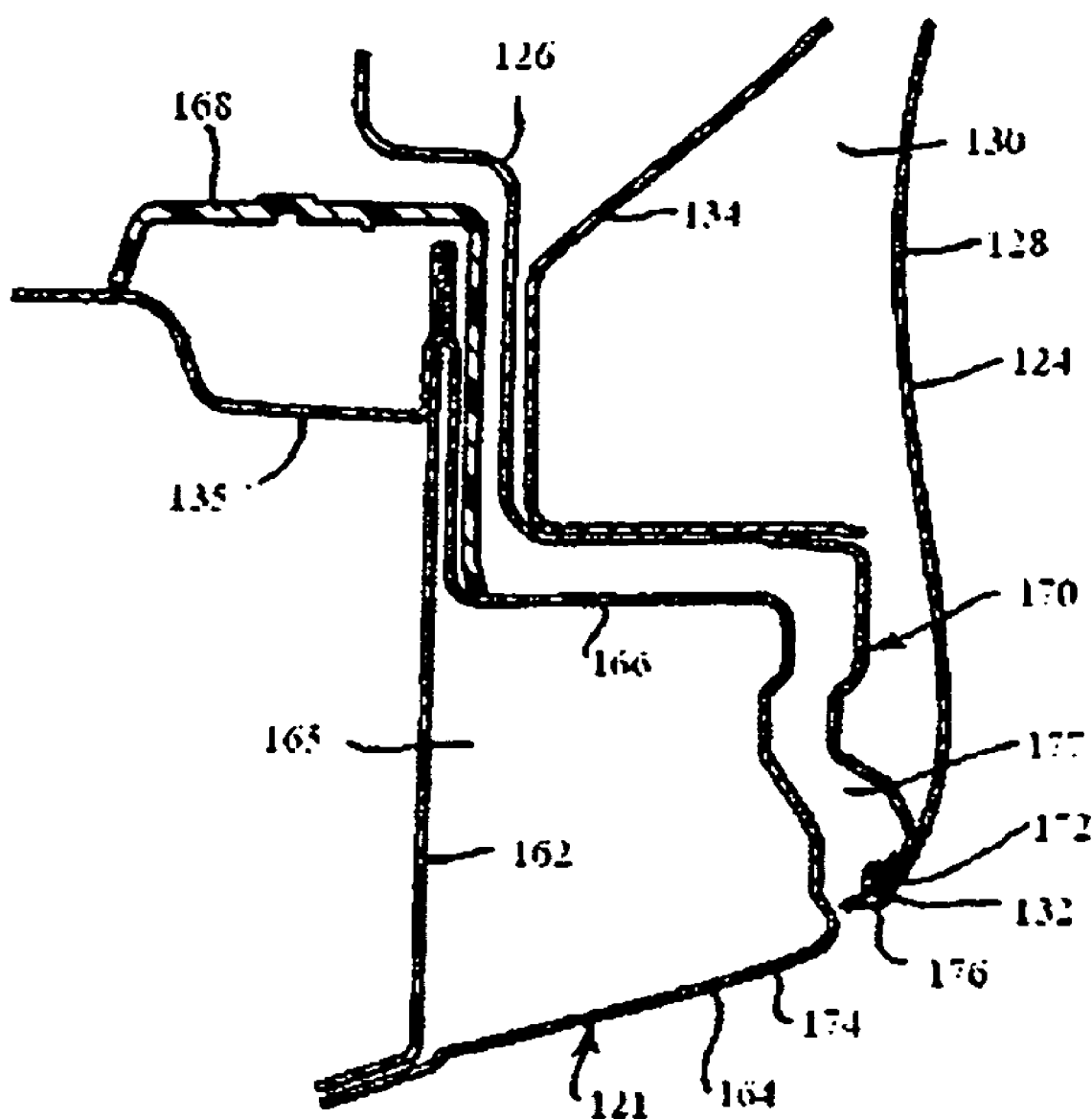

VEHICLE BODY HAVING A FORWARD
FACING REAR DOOR

RELATED APPLICATIONS

The present application is a continuation of U.S. Ser. No. 10/908,475, Filed 13 May 2005, now U.S. Pat. No. 7,000,976, which was a continuation of U.S. Ser. No. 10/463,013 Filed 17 Jun. 2003 (now U.S. Pat. No. 6,913,308) which is a divisional of U.S. Ser. No. 09/669,423 Filed 25 Sep. 2000 (now U.S. Pat. No. 6,609,748), all of the forgoing are incorporated herein by reference.

BACKGROUND OF THE INVENTION

1. Field of the Invention

The present invention relates generally to doors for motor vehicles and, more specifically, to a forward facing rear door assembly for a motor vehicle.

2. Description of the Related Art

It is known to provide a rear door for a motor vehicle. Typically, the rear door faces rearward and is attached to a body of the motor vehicle. The rear door hinges at the "B" pillar of the vehicle body by a pair of upper and lower hinges, and latches at the "C" pillar using a striker attached to the vehicle body.

It is desirable to provide a third door on at least one side of the motor vehicle to aid in the entry to a third row seat inside the motor vehicle. It is also desirable to provide a forward facing rear door for a motor vehicle. It is further desirable to provide a rear door hinging at the "C" pillar of the vehicle body of a motor vehicle. Therefore, there is a need in the art to provide a rear door assembly that meets these desires, and a body side structure that supports the door sag requirements and maintains the body stiffness equal to the baseline.

SUMMARY OF THE INVENTION

Accordingly, the present invention is a forward facing rear door assembly for a motor vehicle. The forward facing rear door assembly includes a forward facing rear door having a forward end and a rear end. The forward facing rear door assembly also includes a hinge connected to a rear end of the forward facing rear door and for connection to a "C" pillar of a vehicle body of the motor vehicle to allow a forward end of the forward facing rear door to open and close a door opening in the vehicle body.

One advantage of the present invention is that a forward facing rear door assembly is provided for a motor vehicle. Another advantage of the present invention is that the body side structure has a unique box-like configuration that provides support for a forward facing rear door. Yet another advantage of the present invention is that the body side structure supports the forward facing rear door with a hinge that is hidden and attached to a "C" pillar of the vehicle body. Still another advantage of the present invention is that the body side structure provides a unique load path within a side of a vehicle body that permits the forward facing rear door to meet system design requirements in drop-off, sag, and frame/seal performance. A further advantage of the present invention is that the body side structure allows a new six-door vehicle body to have bending/torsion stiffness, and bending/torsion modal frequencies that are almost equivalent to a conventional four-door vehicle body.

Accordingly, an embodiment of the present invention is a door reinforcement system for closing a door opening in a side of a body of a pick-up truck including a first door and second door pivotally connected to the body and joined pillarlessly between an open position and a closed position. At least one of the first door and second door includes a vertical beam. The door reinforcement system also includes a door latch striker directly connected to the vertical beam and a door latch connected to the other one of the first door and second door to resist inward movement of the first door and second door from the closed position with respect to the body of the pick-truck.

One feature of the present invention is that a door reinforcement system is provided for a pick-up truck to improve resistance to a side intrusion load. Another feature of the present invention is that the door reinforcement system has a vertical beam constructed inside the forward facing rear door. Yet another feature of the present invention is that the door reinforcement system has a door latch striker attached directly to the vertical beam inside the forward facing rear door. Still another feature of the present invention is that the door reinforcement system has upper and lower latches in line with the vertical beam to provide a load path to the body of the pick-up truck.

Other features and advantages of the present invention will be readily appreciated, as the same becomes better understood, after reading the subsequent description when considered in connection with the accompanying drawings.

BRIEF DESCRIPTION OF THE DRAWINGS

FIG. 4 is an exploded perspective view of the body structure of the forward facing rear door assembly of FIG. 1.

FIG. 6 is an elevational view of a portion of the door reinforcement system and pick-up truck as described in FIG. 1 of U.S. Pat. No. 5,752,737.

FIG. 7 is a sectional view taken along line 3—3 of FIG. 6.

FIG. 8 is a sectional view taken along line 4—4 of FIG. 6.

DESCRIPTION OF THE PREFERRED
EMBODIMENT(S)

List of elements:

| 10 | a door assembly |
| 12 | a motor vehicle |
| 14 | a vehicle body |
| 16 | a forward end |
| 18 | a rear end |

-continued

| | |
|---|---|
| 20 | a pair of sides |
| 22 | a roof |
| 24 | a floor |
| 26 | an occupant compartment |
| 28 | an "A" pillar |
| 30 | a "B" pillar |
| 32 | a "C" pillar |
| 34 | a front door opening |
| 36 | a front door |
| 38 | a rear door opening |
| 40 | a first or rearward facing rear door |
| 42 | a roof rail |
| 44 | a wheel housing |
| 45 | a body side inner panel |
| 46 | a rocker panel |
| 48 | a rear reinforcement |
| 49a | an inner panel |
| 49b | an outer panel |
| 50 | a reinforcement body side member |
| 51 | a "D" pillar |
| 52 | a hinge box |
| 54 | a hinge bulkhead |
| 56 | a hinge-tapping plate |
| 58 | a hinge |
| 60 | a hinge bracket |
| 62 | a forward facing rear door |
| 64 | a rear end |
| 66 | a forward end |
| 68 | a striker or latch member |
| 70 | a latch |
| 72 | a rear end |
| 74 | a handle |
| 76 | a handle |
| 110 | a door reinforcement system |
| 112 | a pick-up truck |
| 116 | a door opening |
| 118 | a side |
| 120 | a roof rail |
| 121 | a rocker |
| 122 | a rearward facing door |
| 124 | a forward facing rear door |
| 126 | an inner panel |
| 128 | an outer panel |
| 130 | a space |
| 131 | a top marginal lip or edge |
| 132 | a bottom marginal lip or edge |
| 134 | a vertical beam |
| 135 | a floor |
| 136 | an inner panel |
| 137 | an outer panel |
| 138 | a space |
| 142 | a reinforcement |
| 144 | an upper portion |
| 146 | an outer surface |
| 147 | an outer space |
| 148 | a weatherstrip |
| 149 | a gap |
| 150 | a weatherstrip |
| 151 | a weather strip |
| 152 | an upper latch assembly |
| 154 | a striker |
| 155 | a fastener |
| 156 | a latch |
| 157 | a shaft |
| 158 | a spring |
| 159 | a recess |
| 160 | a latch housing |
| 161 | a cable |
| 162 | an inner panel |
| 164 | an outer panel |
| 165 | a space |
| 166 | a outer panel portion |
| 168 | a scuff plate |
| 170 | door lower portion |
| 172 | an outer surface |
| 174 | a lower outer surface |
| 176 | a weatherstrip |
| 177 | a gap |
| 178 | a lower latch assembly |
| 180 | a striker |
| 182 | a latch |
| 183 | a shaft |
| 184 | a recess |
| 186 | a latch housing |
| 187 | a cable |
| 190 | a side latch assembly |
| 192 | a striker |
| 194 | a latch |
| 196 | a bracket |
| 198 | an aperture |
| 1102 | an outer door handle |
| 1104 | a side marginal edge |
| 1106 | a weatherstrip |
| 1108 | a gap |
| 1110 | an upper latch reinforcement |

Figure 1:
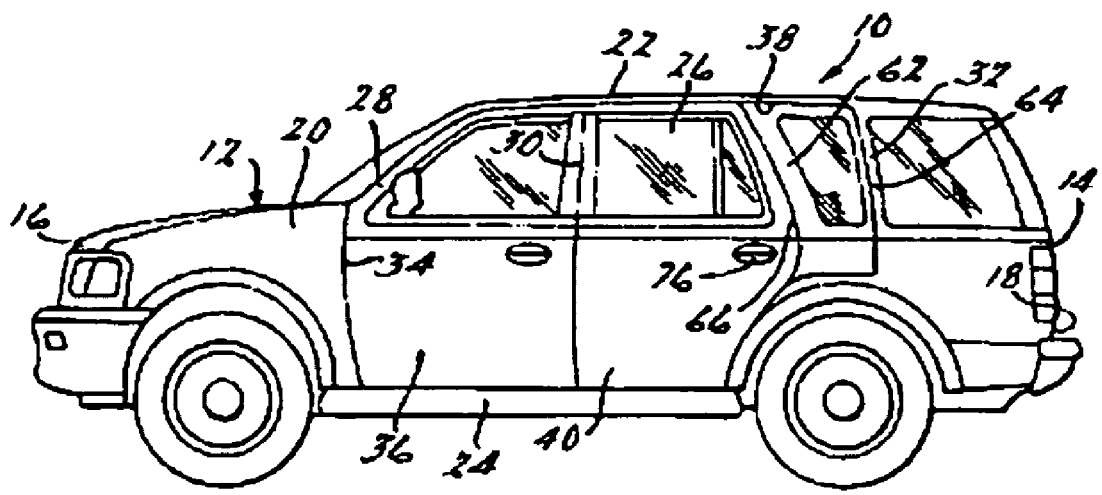
FIG. 1 is an elevational view of a forward facing rear door assembly, according to the present invention, illustrated in operational relationship with a motor vehicle.
Figure 3:
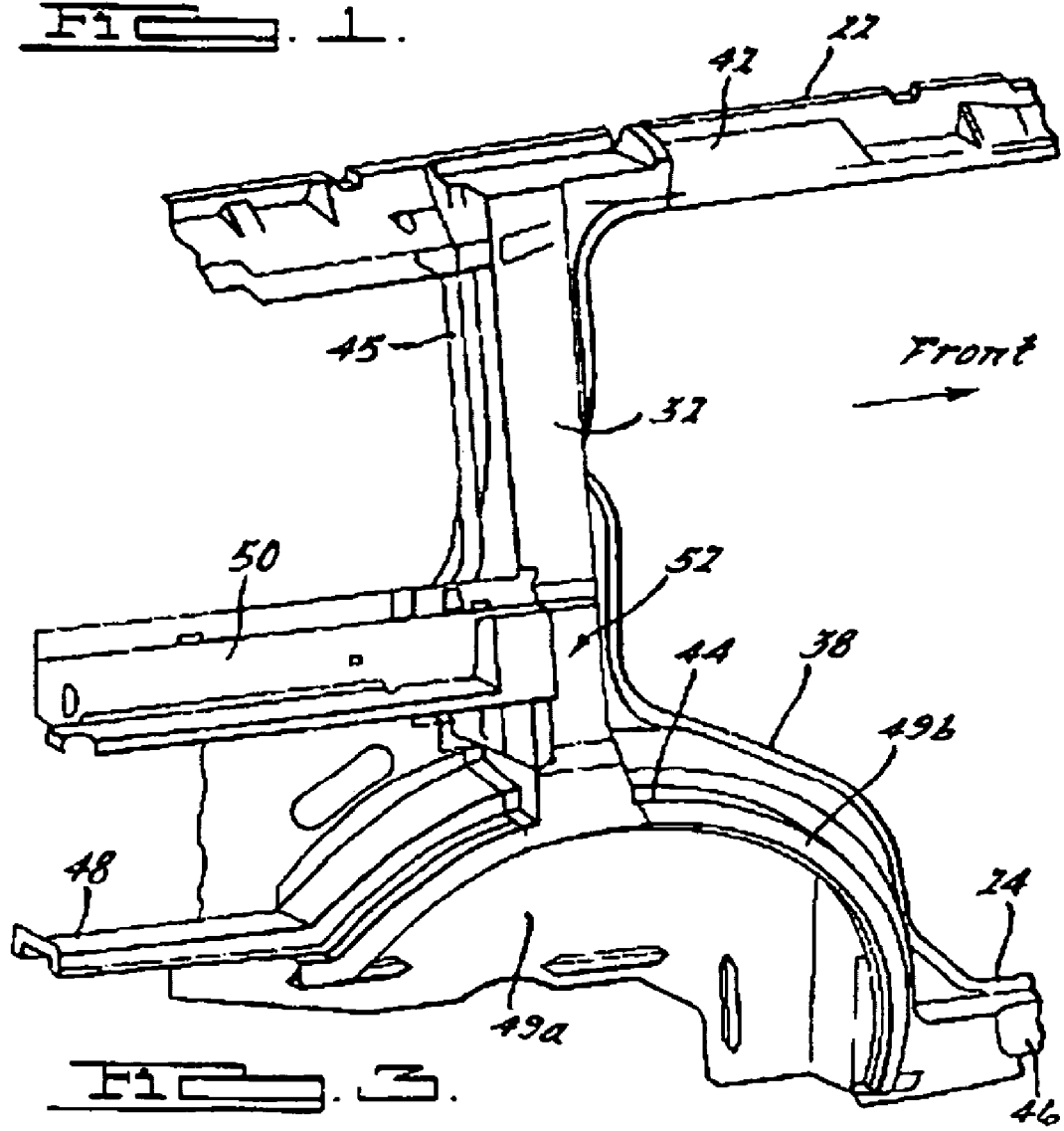
FIG. 3 is an elevational view of a body structure for the forward facing rear door assembly of FIG. 1.

Referring to the drawings and in particular FIG. 1, one embodiment of a forward facing rear door assembly 10, according to the present invention, is shown for a motor vehicle, generally indicated at 12. The motor vehicle 12 includes a vehicle body 14 having a forward end 16, a rear end 18 and a pair of sides 20 spaced laterally and extending longitudinally between the forward end 16 and the rear end 18. The vehicle body 14 also includes a roof 22 and a floor 24 attached to the sides 20 to form an occupant compartment 26 therein.

Figure 2:
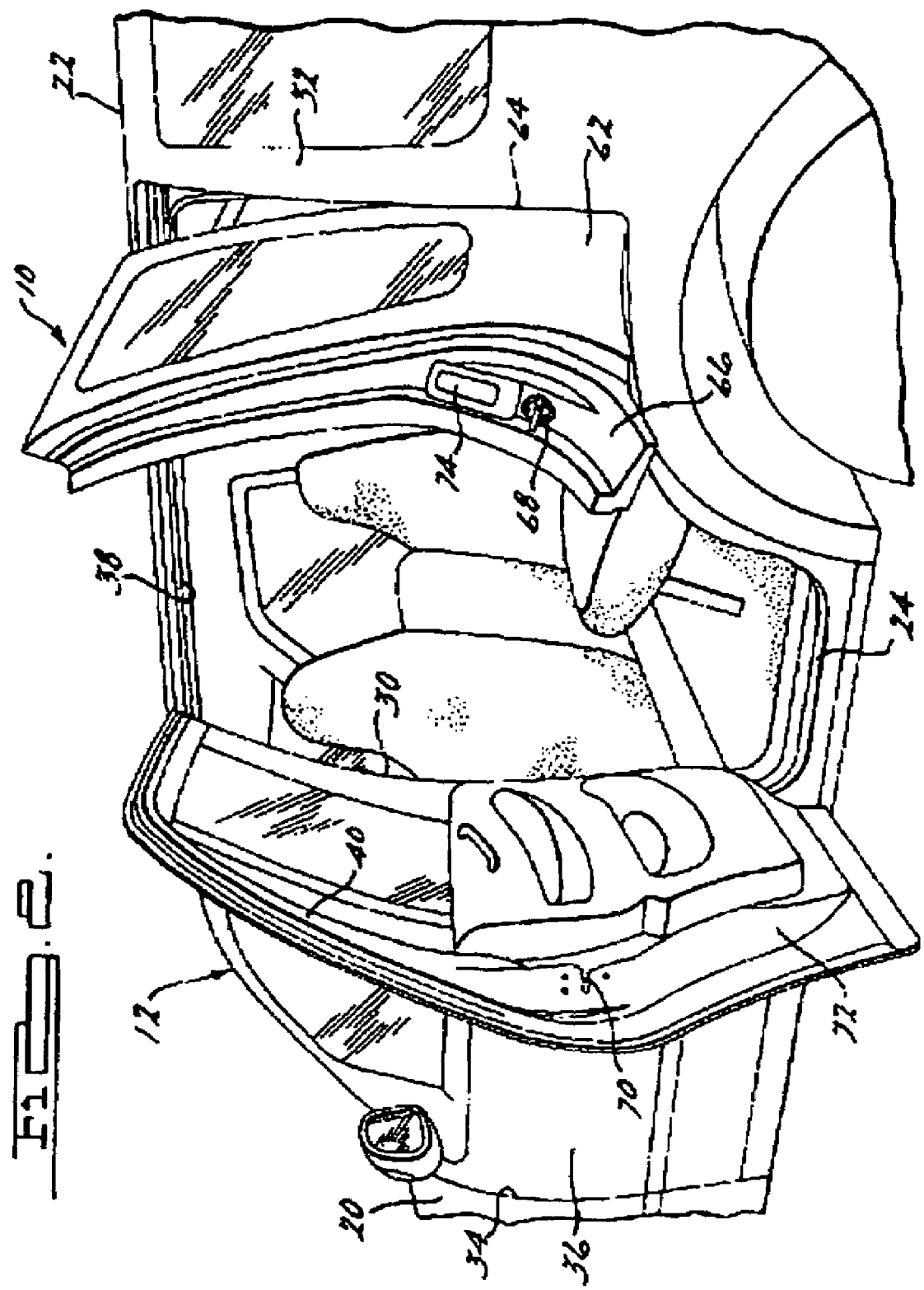
FIG. 2 is a perspective view of the forward facing rear door assembly of FIG. 1, illustrating rear doors in an open position.

Referring to FIGS. 1 and 2, at least one side 20 of the vehicle body 14 includes an "A" pillar 28, a "B" pillar 30, a "C" pillar 32 spaced longitudinally and extending generally vertically between the roof 22 and the floor 24 of the vehicle body 14, and a "D" pillar 51 (shown in FIG. 4). The motor vehicle 12 includes a front door opening 34 in the side 20 of the vehicle body 14 disposed longitudinally between the pillars 28 and 30 and vertically between the roof 22 and the floor 24. The motor vehicle 12 also includes a front door 36 disposed in and closing the front door opening 34. The front door 36 faces rearward or toward the rear end 18 of the vehicle body 14 and is attached at its forward end to the A pillar 28 by suitable means such as upper and lower hinges (not shown). It should be appreciated that the front door 36 is conventional and known in the art.

The motor vehicle 12 also includes a single rear door opening 38 (shown in FIG. 2) in the side 20 of the vehicle body 14 disposed longitudinally between the pillars 30 and 32 and vertically between the roof 22 and the floor 24. The motor vehicle 12 also includes a first or rearward facing rear door 40 disposed in and closing a portion of the rear door opening 38. The rearward facing rear door 40 faces rearward or toward the rear end 18 of the vehicle body 14 and is attached at its forward end to the B pillar 30 by suitable means such as upper and lower hinges (not shown). It should be appreciated that the rearward facing rear door 40 is conventional and known in the art.

Referring to FIGS. 1 through 5B, the forward facing rear door assembly 10 includes the C pillar 32 connected at its upper end to a roof rail 42 of the roof 22 and at its lower end over a wheel housing 44. The C pillar 32 has a generally U shaped cross-section and is connected to a body side inner panel 45 of the side 20 by suitable means such as welding to form a box-like structure having a generally rectangular, preferably square, cross-sectional shape. The wheel housing 44 is generally arcuate in shape and has a forward end attached to a rocker panel 46 of the floor 22 and a rear end attached to a floor pan (not shown) of the floor 22 by suitable means such as welding. The wheel housing 44 has an inner panel 49a and an outer panel 49b. The C pillar 32 is also connected to the inner panel 49a of the wheel housing 44 by suitable means such as welding. The forward facing rear door assembly 10 may also include a rear reinforcement 48 connected to the C pillar 32 and wheel housing 44 and floor pan by suitable means such as welding.

The forward facing rear door assembly 10 also includes a reinforcement body side member 50 extending longitudinally and having a forward end attached to the C pillar 32 by suitable means such as welding and a rear end attached to D pillar 51 by suitable means such as welding. The forward facing rear door assembly 10 includes a hinge box 52 disposed within and connected to the C pillar 32 by suitable means such as welding. It should be appreciated that hinge strength is achieved within the hinge box 52.

The hinge box 52 includes a hinge bulkhead 54 disposed behind the C pillar 32 and attached thereto by suitable means such as welding. The hinge box 52 also includes hinge-tapping plate 56 connected to the hinge bulkhead 54 by suitable means such as fasteners (not shown). The hinge box 52 includes a single hinge 58 having one end connected to the hinge tapping plate 56 by the fasteners. The hinge box 52 also includes a hinge bracket 60 attached to the other end of the hinge 58 and to a forward facing rear door 62 to be described. It should be appreciated that the hinge 58 is hidden from view and opens one hundred eighty degrees (180 degrees.)

The forward facing rear door assembly 10 further includes a second or forward facing rear door 62 disposed in and closing a portion or remainder of the rear door opening 38. The forward facing rear door 54 faces forward or toward the front end 16 of the vehicle body 14. The forward facing rear door 62 has a rear end 64 adjacent the C pillar 32 and a forward end 66 adjacent a rear end of the rearward facing rear door 40. The rear end 64 of the forward facing rear door 62 is attached to the hinge bracket 60 by suitable means such as fasteners (not shown). The forward facing rear door assembly 10 further includes a striker or latch member 68 attached to the forward end 66 of the forward facing rear door 62 for engagement and disengagement with a latch 70 on a rear end 72 of the rearward facing rear door 40. It should be appreciated that the latch member 68 and latch 70 are conventional and known in the art. It should also be appreciated that the rearward facing rear door 40 and forward facing rear door 62 are joined together in a pillar less manner. It should further be appreciated that the forward facing rear door assembly 10 may include a handle 74 on the forward end 66 of the forward facing rear door 62 to actuate latches (not shown) on the forward facing rear door 62 which engage and disengage the roof rail 42 and the rocker panel 46 similar to that disclosed in U.S. Pat. No. 5,752,737 to Heldt et al., the disclosure of which is hereby incorporated by reference.

Figure 5A:
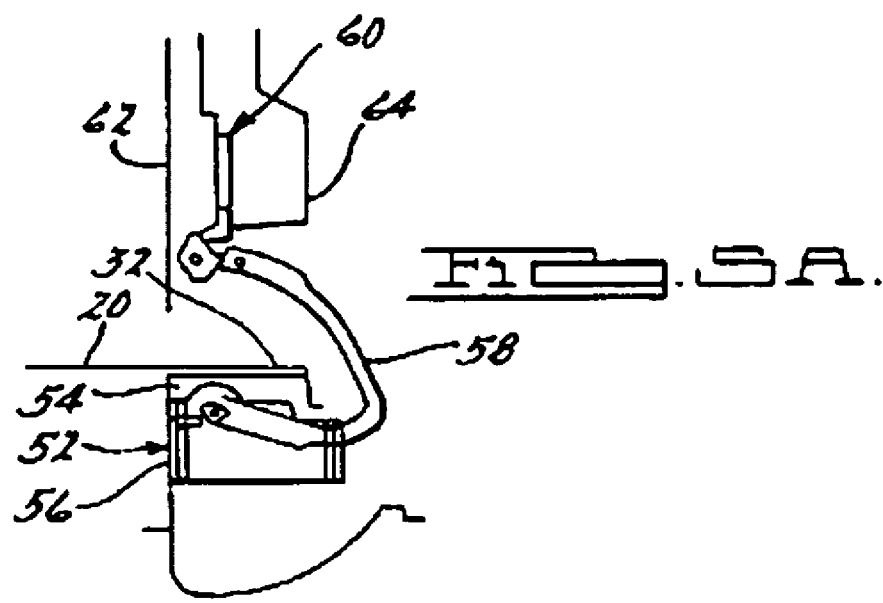
FIGS. 5A and 5B are sectional views of the forward facing rear door assembly of FIG. 1, illustrating a forward facing rear door in an open and closed position respectively.
Figure 5B:
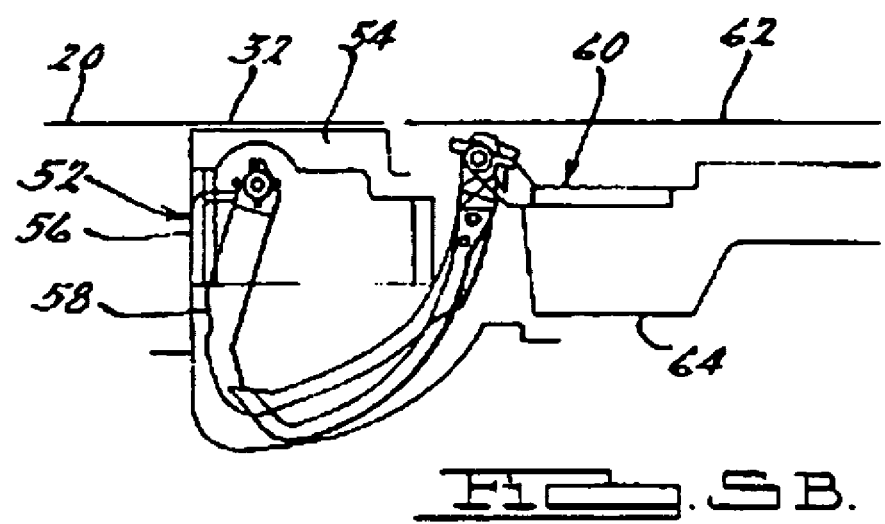

In operation, a handle 76 upon the rearward facing rear door 40 is actuated to release the latch 70 from the latch member 68 and the rearward facing rear door 40 is pivoted outwardly and forwardly as illustrated in FIG. 2. The handle 74 upon the forward facing rear door 54 is actuated to release latches (not shown) and the forward facing rear door 62 is pivoted outwardly and rearwardly as illustrated in FIGS. 2 and 5A. The hinge 58 opens 180 degrees in two increments, first 90 degrees, then by activating an auxiliary lever (not shown), it opens to a full 180 degrees. The operation is reversed for closing the doors 40 and 62.

The following text is from U.S. Pat. No. 5,752,737, which has been expressly incorporated into this application and the elements have been renumbered for clarity.

Turning now to FIG. 6, a door reinforcement system 110, according to this embodiment of the present invention, is illustrated in operational relationship to a pick-up truck, generally indicated at 112. The pick-up truck 112 includes a body having an aperture or door opening 116 formed through its side 118. The body includes a roof rail, generally indicated at 120, forming a top portion of the door opening 116. The body also includes a rocker, generally indicated at 121, forming a lower portion of the door opening 116. It should be appreciated that vertical pillars form side portions of the door opening 116. It should also be appreciated that the door opening 116 is a continuous aperture extending longitudinally between the vertical pillars and vertically between the roof rail 120 and rocker 121.

The door reinforcement system 1110 includes a pair of doors 122, 124 disposed in the door opening 116 and connected to the body to open and close the door opening 116. As illustrated in FIG. 6, a rearward facing door 122 is disposed in a forward portion of the door opening 116 and pivotally connected in a known manner through hinges (not shown) to the vertical pillar of the body for pivotal movement about a vertical hinge axis between open and closed positions. A forward facing rear door 124 is disposed in a rear portion of the door opening 116 and pivotally connected in a known manner through hinges (not shown) to the vertical pillar of the body for pivotal movement about a vertical hinge axis between open and closed positions. It should be appreciated that the rearward facing door 122 and forward facing rear door 124 are joined pillarlessly together when in the closed position for closing the door opening 116 as illustrated in FIG. 6. It should also be appreciated that the rearward facing door 122 and forward facing rear door 124 swing outwardly in open positions to provide access to an occupant compartment of the pick-up truck 112.

Referring to FIGS. 6, 7 and 8, the rearward facing door 122 and forward facing rear door 124 each include an inner panel 126 and an outer panel 128 joined to the inner panel 126 and forming a space 130 there between. The inner panel 126 and outer panel 128 are jointed together by a hem flange to form a top marginal lip or edge 131 at an upper end and a bottom marginal lip or edge 132 at a lower end thereof. The forward facing rear door 124 includes a vertical reinforcement assembly comprising a vertical beam 134 and an upper latch reinforcement 1110 to be described, disposed within the space 130 and extending vertically from approximately a mid-vertical point of the rear door 124 upwardly to the roof rail 120 and downwardly to the rocker 121 to overlap a floor 135 of the pick-up truck 112. The vertical beam 134 is preferably formed as a stamping and is secured to the inner panel 126 by fixed mechanical means such as welding. It should be appreciated that the rearward facing door 122 is longitudinally longer than the forward facing rear door 124 such that the vertical beam 134 is offset rearwardly from a mid or centerpoint of the door opening 116.

As illustrated in FIG. 7, the roof rail 120 is a box section having an inner panel 136 and an outer panel 137 joined to the inner panel 136 to form a space 138 therebetween. The roof rail 120 may include a reinforcement 142 disposed in the space 138 and secured to the inner panel 136 by fixed mechanical means such as welding. The rear door 124 includes an upper portion, generally indicated at 144, which extends upwardly to overlap a portion the roof rail 120. The upper portion 144 has an outer surface 146 on the outer panel 128 substantially flush with an outer surface 147 of the roof rail 120. The upper portion 144 may include a weatherstrip 148 along the inner panel 126 of the forward facing rear door 124 to engage the outer panel 137 of the roof rail 120 and seal a gap 149 between the forward facing rear door 124 and roof rail 120. The roof rail 120 may include a weatherstrip 150 along an inner and upper portion of the outer panel 137 of the roof rail 120 to engage the inner panel 126 of the forward facing rear door 124 and seal the gap 149. The roof rail 120 may include a weatherstrip 151 along a joint at a lower end of the inner panel 136 and outer panel 137 to engage the inner panel 126 of the forward facing rear door 124 and seal the gap 149.

The door reinforcement system 1110 also includes an upper latch assembly, generally indicated at 152, to latchingly secure the forward facing rear door 124 to the roof rail 120 when the forward facing rear door 124 is in the closed position. The upper latch assembly 152 is located in line with a vertical axis of the vertical beam 134. The upper latch assembly 152 includes a striker 154 projecting outwardly from the inner portion of the outer panel 137 of the roof rail. The striker 154 has a generally inverted U-shape and is secured to the inner portion of the outer panel 137 by mechanical means such as fasteners 155. The upper latch assembly 152 also includes a latch 156 carried on the inner panel 126 of the forward facing rear door 124. The latch 156 rotates about a shaft 157 that is biassed by a spring 158 and has a recess 159 to receive a portion of the striker 154. The shaft 157 is pivotally connected to a latch housing 160. The latch housing 160 is secured to an upper latch reinforcement 1110, which is an extension of the vertical beam 134, by fixed mechanical means such as welding. The upper latch reinforcement 1110 may be integral and one-piece with the vertical beam 134. The upper latch reinforcement 1110 is secured to the inner panel 126 by fixed mechanical means such as welding. The upper latch assembly 134 is conventionally locked, latched and unlatched, through mechanisms well known in the automotive body arts, including a cable 161 and an interior door handle (not shown). It should be appreciated that many combinations of latching and locking devices are possible and are well known to those skilled in the automotive body arts.

As illustrated in FIG. 8, the rocker 121 is a box section having an inner panel 162 and an outer panel 164 joined to the inner panel 162 to form a space 165 there between. The outer panel 164 has a portion 166 located inboard and extending upwardly and secured at one end to a portion of a floor pan 135 and inner panel 162. It should be appreciated that a scuff plate 168 may be disposed between the portion 166 and inner panel 126 and overlapping a portion of the floor pan 135.

The forward facing rear door 124 includes a lower portion, generally indicated at 170, which extends downwardly to overlap a portion of the rocker 121. The lower portion 170 has an outer surface 172 on the outer panel 128 substantially flush with a lower outer surface 174 of the outer panel 164 of the rocker 121. The forward facing rear door 124 may include a weatherstrip 176 along the bottom marginal edge 132 to engage the portion 166 and seal a gap 177 between the rocker 121 and the forward facing rear door 124. It should be appreciated that the door 122 also has an upper portion 144 and lower portion 170 to overlap the roof rail 120 and rocker 121, respectively. It should also be appreciated that the door 122 has a horizontal intrusion or reinforcement beam (not shown) which is conventional and known in the automotive body arts.

Figure 9:
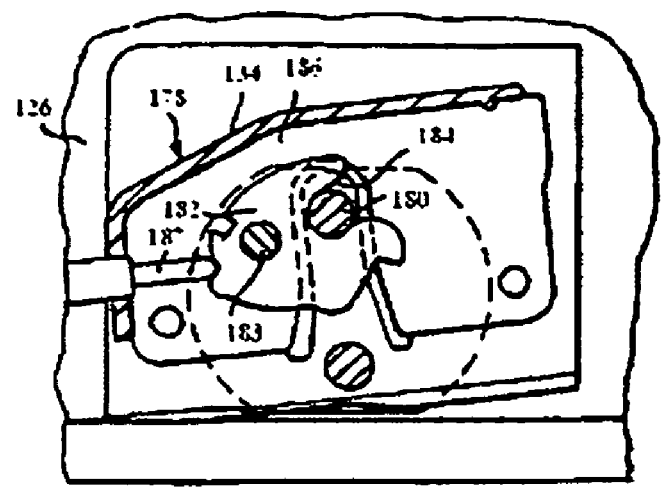
FIG. 9 is a sectional view taken along line 5—5 of FIG. 6.

As illustrated in FIG. 9, the door reinforcement system 1110 also includes a lower latch assembly, generally indicated at 178, to latchingly secure the rear door 124 to the rocker 121 when the forward facing rear door 124 is in the closed position. The lower latch assembly 178 is located in line with a vertical axis of the vertical beam 134. The lower latch assembly 178 includes a striker 180 projecting upwardly from the portion 166 of the outer panel 164 of the rocker 121. The striker 180 has a generally inverted U-shape and is secured to the portion 166 of the outer panel 164 by mechanical means such as fasteners (not shown). The lower latch assembly 178 also includes a latch 182 connected on the inner panel 126 of the forward facing rear door 124. The latch 182 rotates about a shaft 183 that is biased by a spring (not shown) and has a recess 184 to receive a portion of the striker 180. The shaft 183 is pivotally connected to a latch housing 186. The latch housing 186 is secured to the vertical beam 134 by mechanical means such as bolts (not shown). The lower latch assembly 178 is conventionally locked, latched and unlatched, through mechanisms well known in the automotive body arts, including a cable 187 and an interior door handle (not shown). It should be appreciated that many combinations of latching and locking devices are possible and are well known to those skilled in the automotive body arts.

Figure 10:
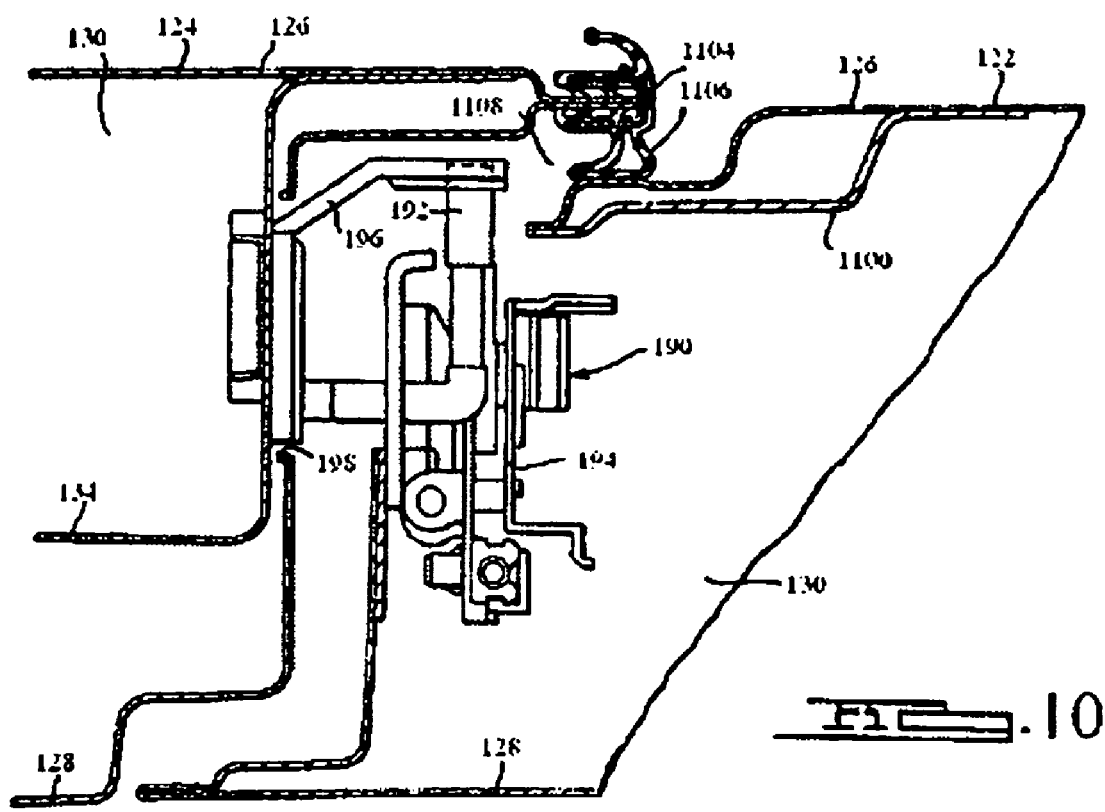
FIG. 10 is a sectional view taken along line 6—6 of FIG. 6.

Referring to FIG. 10, the door reinforcement system 1110 includes a side latch assembly, generally indicated at 190, to hold the doors 122,124 fast in the closed position. As illustrated, the side latch assembly 190 includes a striker 192 carried by the forward facing rear door 124 and a latch 194 carried by the rear facing door 122 to engage the striker 192. The striker 192 has a generally "L" shape and is connected to a bracket 196 which is secured by mechanical means such as fasteners (not shown) directly to the vertical beam 134. The striker 192 extends longitudinally through an aperture 198 in the outer panel 128 to engage the latch 194. The latch 194 is secured by mechanical means such as fasteners (not shown) to a reinforcement member 1100 which is connected to the inner panel 126 by fixed mechanical means such as welding. The side latch assembly 190 is conventionally locked, latched and unlatched, through mechanisms well known in the automotive body arts, including an outer door handle 1102 (FIG. 6). Additionally, a longitudinal edge of the inner panel 126, and outer panel 128 are joined together to form a side marginal lip or edge 1104 along the forward facing rear door 124 and may includes a weatherstrip 1106 along the side marginal edge 1104 to engage the inner panel 126 of the rear facing door 122 and seal a gap 1108 between the forward facing rear door 124 and rear facing door 122.

Upon imposition of an excessive or side intrusion load on the outer panel 128 of the rear facing door 122 and forward facing rear door 124, the tendency of the doors 122,124 to deflect inward toward the interior or occupant compartment of the pick-up truck 112 is resisted in part by the vertical reinforcement assembly and the portions 144 and 170 overlapping the roof rail 120 and rocker 121, respectively. The upper and lower latch assemblies 152 and 178 are in line with the vertical reinforcement assembly to provide a load path to the body. It should be appreciated that the vertical reinforcement assembly receives load through the side latch assembly 190 and transmit the load to the floor and roof of the pick-up truck 112.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A vehicle body comprising:
"A", "B" and "C" pillars, the opening between said "A" and "B" pillars defining a front door opening and the opening between said "B" and "C" pillars defining a rear door opening;
a front door pivotally attached to said "A" pillar;
a rear door pivotally attached to said "B" pillar;
a "C" pillar hinge pivotally attaching a forward facing rear door to said "C" pillar, said "C" pillar hinge hidden when said forward facing rear door is closed.

2. The vehicle body of claim 1, wherein said forward facing rear door is supported by a single "C" pillar hinge.

3. The vehicle body of claim 1, further comprising a striker on said rear door and a latch on said forward facing rear door, said latch engages said striker when both said rear door and said forward facing rear door are closed.

4. The vehicle body of claim 1, further comprising a striker on said forward facing rear door and a latch on said rear door, said latch engages said striker when both said rear door and said forward facing rear door are closed.

5. The vehicle body of claim 1, wherein said "C" pillar hinge articulates 180 degrees.

6. The vehicle body of claim 5, wherein said "C" pillar hinge opens in two increments.

7. The vehicle body of claim 1, further comprising a first outer panel having a first outer surface on said vehicle body and a second outer panel having a second outer surface on said forward facing rear door, said first and second outer panels being substantially flush when said forward facing rear door is closed.

8. The vehicle body of claim 1, wherein said rear door opening is pillarless.

9. A vehicle comprising:
a first side having two rearward facing doors and forward facing door; and
a second side having two rearward facing doors and a forward facing door.

10. A six-door vehicle having first and second sides, said first side defining a first front door opening and a first rear door opening, said second side defining a second front door opening and a second rear door opening, comprising:
a first front door pivotally attached to said first side and closing said first front door opening;
a first rearward facing rear door pivotally attached to said first side;
a first forward facing rear door pivotally attached to said first side, said first rearward facing rear door and said first forward facing rear door closing said first rear door opening;
a second front door pivotally attached to said second side and closing said second front door opening;
a second rearward facing rear door pivotally attached to said second side; and
a second forward facing rear door pivotally attached to said second side, said second rearward facing rear door and said second forward facing rear door closing said second rear door opening.

11. A vehicle body comprising:
"A", "B" and "C" pillars, said "C" pillar attached to a wheel housing, the opening between said "A" and "B" pillars defining a front door opening and the opening between said "B" and "C" pillars and said wheel housing defining a rear door opening;
a front door pivotally attached to said "A" pillar;
a rear door pivotally attached to said "B" pillar; and
a forward facing rear door pivotally attached to said "C" pillar.

12. The vehicle body of claim 11, wherein said forward facing rear door is supported by a single "C" pillar hinge.

13. The vehicle body of claim 11, further comprising a striker on said rear door and a latch on said forward facing rear door, said latch engages said striker when both said rear door and said forward facing rear door are closed.

14. The vehicle body of claim 11, further comprising a striker on said forward facing rear door and a latch on said rear door, said latch engages said striker when both said rear door and said forward facing rear door are closed.

15. The vehicle body of claim 12, wherein said "C" pillar hinge articulates 180 degrees.

16. The vehicle body of claim 15, wherein said "C" pillar hinge opens in two increments.

17. The vehicle body of claim 11, further comprising a first outer panel having a first outer surface on said vehicle body and a second outer panel having a second outer surface on said forward facing rear door, said first and second outer panels being substantially flush when said forward facing rear door is closed.

18. The vehicle body of claim 11, wherein said rear door opening is pillarless.

19. The vehicle body of claim 11, wherein said forward facing rear door aids entry to a third row seat.

20. A six-door vehicle having two sides, each side comprising:
"A", "B" and "C" pillars, said "C" pillar attached to a wheel housing, and the opening between said "A" and "B" pillars defining a front door opening and the opening between said "B" and "C" pillars and said wheel housing defining a rear door opening;
a front door pivotally attached to said "A" pillar;
a rear door pivotally attached to said "B" pillar; and
a forward facing rear door pivotally attached to said "C" pillar.

21. A vehicle comprising:
a pair of sides, each side having two rearward facing doors and a forward facing rear door, said forward facing rear door aiding entry to a third row seat.

22. The vehicle of claim 21, wherein said doors are pivotally connected to said sides.

23. The vehicle of claim 22, wherein said sides further comprise "A", "B", "C" and "D" pillars, said rearward facing doors connected to said "A" and "B" pillars and said rearward facing door connected to said "C" pillar.

24. The vehicle of claim 23, wherein said third row seat is positioned adjacent said forward facing rear door.

25. A vehicle having a pillarless side door opening closed by a rearward facing door and a forward facing rear door comprising:
a pillar connected at its upper end to a roof rail; and
a 180 degree hinge connecting said forward facing rear door to said pillar, said 180 degree hinge hidden when said doors are closed.

26. The vehicle of claim 25, further comprising a wheel housing wherein said pillar is connected at its lower end to said wheel housing.

27. The vehicle of claim 25, wherein said 180 degree hinge opens in two increments.

28. The vehicle of claim 27, wherein said 180 degree hinge opens to a first increment of 90 degrees.

29. The vehicle of claim 28, wherein said 180 degree hinges opens to a second increment of 180 degrees.

30. A six-door vehicle having two body side structures that meet door sag requirements and maintains body stiffness equal to baseline, each side structure comprising:
- "A", "B" and "C" pillars, and the opening between said "A" and "B" pillars defining a front door opening and the opening between said "B" and "C" pillars defining a rear door opening;
- a front door pivotally attached to said "A" pillars;
- a rear door pivotally attached to said "B" pillars; and
- a forward facing rear door pivotally attached to said "C" pillars.

31. A six-door vehicle having bending/torsion stiffness and torsion modal frequencies that are almost equivalent to a conventional four-door vehicle body, comprising:
- "A", "B" and "C" pillars, the opening between said "A" and "B" pillars defining a front door opening, and the opening between said "B" and "C" pillars defining a rear door opening;
- a front door pivotally attached to said "A" pillar;
- a rear door pivotally attached to said "B" pillar; and
- a forward facing rear door pivotally attached to said "C" pillar.

32. The six-door vehicle of claim 31 further comprising:
- a side door latch striker; and
- a side door latch, said side door latch engages said side door latch striker to resist inward movement of said forward facing rear door and said rear door from a closed position upon imposition of an excessive side intrusion load on an outer panel of said rear door and said forward facing rear door.

* * * * *